United States Patent [19]

Reichelt

[11] Patent Number: 4,865,092

[45] Date of Patent: Sep. 12, 1989

[54] VOLUMETRIC METERING APPARATUS FOR GRANULAR MATERIAL

[75] Inventor: Wolfgang Reichelt, Gottmadingen/Randegg, Fed. Rep. of Germany

[73] Assignee: SIG Schweizerische Industrie-Gesellschaft, Neuhausen am Rheinfall, Switzerland

[21] Appl. No.: 154,189

[22] Filed: Feb. 10, 1988

[30] Foreign Application Priority Data

Feb. 20, 1987 [CH] Switzerland ............................ 643/87

[51] Int. Cl.$^4$ ............................................. G01F 11/10
[52] U.S. Cl. .................................... 141/280; 141/129; 141/144; 222/342; 222/345; 222/370
[58] Field of Search ............... 141/280, 125, 129, 132, 141/144; 222/636, 346, 345, 342, 370

[56] References Cited

U.S. PATENT DOCUMENTS

| 2,315,866 | 4/1943 | McBeam | 222/370 |
| 2,705,092 | 3/1955 | Woodruff | 222/345 X |
| 3,554,412 | 1/1971 | Hayashi et al. | 222/346 |
| 4,177,941 | 12/1979 | Leong | 222/636 |
| 4,192,359 | 3/1980 | Pippin | 141/12 |
| 4,751,948 | 6/1988 | Hertig et al. | 141/67 |

FOREIGN PATENT DOCUMENTS

| 1424089 | 6/1970 | Fed. Rep. of Germany . | |
| 2424063 | 12/1975 | Fed. Rep. of Germany . | |
| 3036018 | 3/1981 | Fed. Rep. of Germany | 222/370 |
| 863876 | 4/1941 | France | 222/370 |
| 458144 | 12/1936 | United Kingdom | 222/370 |
| 890969 | 3/1962 | United Kingdom . | |

*Primary Examiner*—Ernest G. Cusick
*Attorney, Agent, or Firm*—Spencer & Frank

[57] ABSTRACT

A volumetric metering apparatus for dosing constant quantities of granular material includes a generally vertically oriented shaft having a shaft axis, a cylindrical trough having a generally horizontal trough base and being mounted on the shaft for rotation about the shaft axis and a plurality of metering receptacles secured to the trough base and extending downwardly therefrom. Each metering receptacle has a top opening being in a continuous communication with a space above the trough base and a bottom outlet openable and closable by a shutoff element. There is further provided an evener device stationarily supported above the trough base. The metering receptacles are arranged to be brought in succession into alignment with the evener device by the rotation of the cylindrical trough. The evener device has a radial dimension measured parallel to the trough base; the radial dimension is greater than a diametral dimension of each top opening. The evener device has an evening edge and there is provided a drive for moving the evening edge parallel to the trough base.

10 Claims, 1 Drawing Sheet

VOLUMETRIC METERING APPARATUS FOR GRANULAR MATERIAL

BACKGROUND OF THE INVENTION

This invention relates to a volumetric metering apparatus for dosing constant quantities of granular material and is of the type which has a cylindrical trough rotated about its axis and equipped with a plurality of metering receptacles which extend downwardly from a planar base of the cylindrical trough and which are continuously open at the top for communicating with the space within the trough. Further, above the trough base there is arranged a stripper or evener which has a radial dimension that is wider than the upward openings of the metering receptacles. Each metering receptacle has, at its lower end, a closing element which is opened when the metering receptacle assumes its filling position in a discharging station.

A metering apparatus of the above-outlined type is disclosed in German Offlenlegungsschrift (Non-examined Published Application) No. 2,424,063. The apparauts has a cylindrical trough having a planar horizontal base. A plurality of metering receptacles which continuously communicate with the trough are attached thereto such that they extend downwardly from the base and are arranged on a common dividing circle of the trough. With each metering receptacle there is associated a vibrating device to ensure that the granular mass is maintained constant in the individual receptacles. At the lower end each receptacle is closed off by a plate member which is in an open position when the respective metering receptacle is in a discharge position. Above the metering receptacle which dwells in the discharge position, a stationary evener is arranged which limits the level of the granular material contained in the metering receptacle. In case the granular material has relatively coarse granules, the evener has an undesired shearing effect on the granular material passing thereunder. This phenomenon leads to irregularities in the surface of the granular material with which the metering receptacles are filled. As a result, the metered material quantities are disadvantageously lacking uniformity. A similar metering apparatus is disclosed in German Auslegeschrift (Examined Published Patent Application) No. 1,424,089.

In the metering apparatus disclosed in U.S. Pat. No. 4,192,359 no dosing receptacles are present; rather, packaging containers for beans are being filled. The beans are introduced into a rotary trough which is provided with openings below which the containers are disposed. Prior to removing the containers, they pass below cylindrical brushes rotated about a horizontal axis.

SUMMARY OF THE INVENTION

It is an object of the invention to provide a metering apparatus of the above-outlined type in which the material quantities are maintained constant in an improved manner.

This object and others to become apparent as the specification progresses, are accomplished by the invention, according to which, briefly stated, the evener has an evening edge movable parallel to the trough base.

Tests have shown that an evener which has an evening edge moved parallel to the trough base results in a significantly more uniform top surface of the granular material than a stationary evener of prior art constructions. In particular, by means of an evener disc rotated parallel to the rotary axis of the trough, the shearing effect of the evener in the circumferential direction of the trough is demonstrably significantly reduced.

DESCRIPTION OF THE PREFERRED EMBODIMENT

Figure 1:
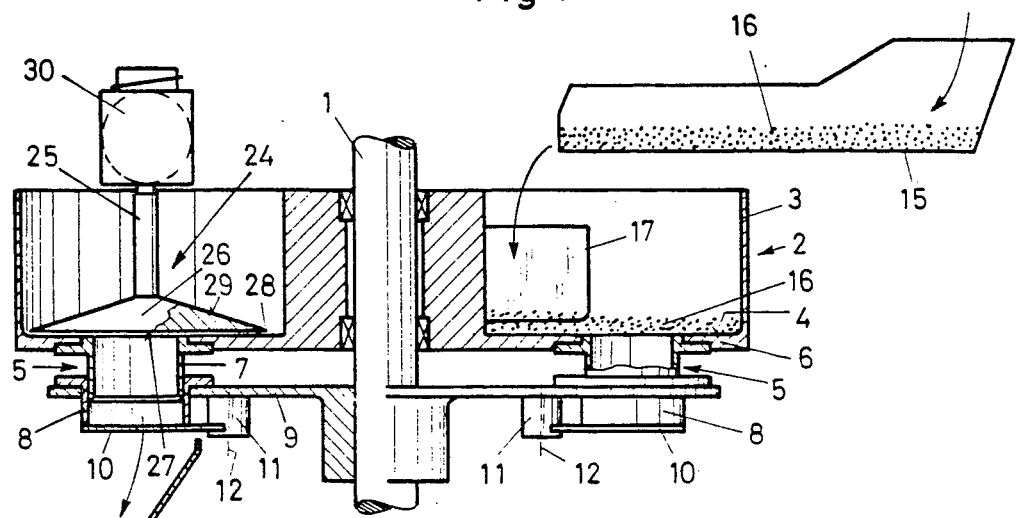
FIG. 1 is a sectional elevational view of a preferred embodiment of the invention.
Figure 2:
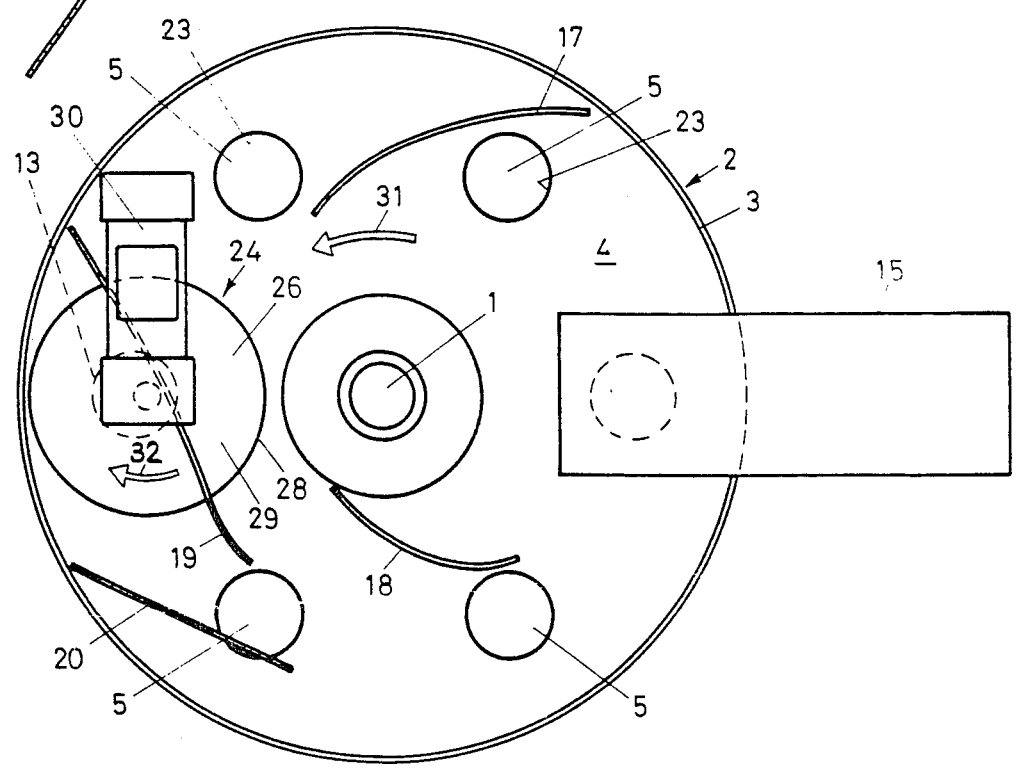
FIG. 2 is a top plan of the construction shown in FIG. 1.

Turning to the Figures, the metering apparatus illustrated therein has a vertical shaft 1 which supports for rotation a trough 2 having a peripheral vertical cylindrical wall 3 and a horizontal base 4. In the trough base 4 there are provided equidistantly spaced circular openings 23 whose center lies on a common dividing circle of the trough base 4. Underneath each opening 23 there is arranged a separate metering receptacle 5 which has a continuously open top communicating with the space of the trough 2 surrounded by the cylindrical wall 3. Each metering receptacle 5 is formed of a cylindrical sleeve 7 and a jacket 8 surrounding a lower circumferential part of the sleeve 7 concentrically therewith. The top part of each sleeve 7 is secured to the underside of the base plate 4. Each jacket 8 is inserted into apertures of a plate 9 secured to the shaft 1 in a coaxial relationship with the trough 2. The plate 9 is axially adjustable relative to the trough 2. Each metering receptacle 5 is provided at its lower end with a closure gate 10 which is pivotally mounted on a support 11 affixed to the plate 9 and having an axle 12. In a discharging station 13 shown at the left side of FIGS. 1 and 2, the gate 10 is, by means of a non-illustrated mechanism, for example, a follower running on a cam disc, pivoted away laterally whereby the contents of the metering receptacle 5 are emptied into a filling chute 14. The metered material volume may be varied by changing the axial distance of the plate 9 from the trough 2 causing a telescoping movement between each sleeve 7 on the one hand and the associated jacket 9 on the other hand, thereby varying the effective axial length of the metering receptacles 5. The trough 2 is charged with the granular material 16 by a conveyor 15. The granular material 16 is distributed on the base plate 4 by non-rotating but height-adjustable guide plates 17, 18, 19 and 20 which guide the granular material into the metering receptacles 5.

In the discharge station 13, into which the metering receptacles 5 are sequentially moved as the trough 2 is rotated, there is disposed an evener (stripper) device 24, supported above the trough base 4. The evener device 24 comprises a conical disc 26 rotatable about a shaft 25 which is oriented parallel to the shaft 1. The conical disc 26 has a base diameter which is greater than the diameter of the filler opening 23 and has a planar underside 27 which is parallel to and slightly spaced from the base plate 4 of the trough 2. The periphery 28 of the disc 26 is constituted by a sharp edge, and the conical surface 29 of the disc 26 is roughened, for example, by sandblasting or ballblasting and has a cone angle in excess of 120°. The conical disc 26 is rotated by a motor 30 in a direction 32 which is opposite to the rotary direction 31 of the trough 2.

In the description which follows, the operation of the above-described apparatus will be set forth.

The granular material 16, for example, a cereal, is introduced by the conveyor belt 15 into the counter-clockwise rotating trough 2 and is, by the guides 17-20 distributed and pushed into the metering receptacles 5. The top level of the granular material which eventually presents itself to the evening device 24 is determined by the lower edge of the guide 17. The conical disc 26 which rotates clockwise wipes the granular material 16 above the base plate 4 in the direction of the rotary shaft 1 of the trough 2. During this operation, the shearing component of the periphery 28 of the disc 26 works on the granular material 16 essentially radially relative to the trough 2. This occurrence has, combined with the planar underside 27 of the disc 26 an evening effect whereupon the top face of the granular material 16 in the metering receptacle 5 dwelling in the discharge position 13 is planarized and thus a uniform filling of the metering receptacles 5 is achieved. The excess material 16 pushed onto the upper, conical face 29 of the disc 26 is, by virture of the coarse surface moved effectively towards the center of the trough 2 and is, by the radially outwardly directed guides 18 and 19 guided into the metering receptacles 5 which are downstream of the disc 26 and which are still in an unfilled state.

It will be understood that the above description of the present invention is susceptable to various modifications, changes and adaptations, and the same are intended to be comprehended within the meaning and range of equivalents of the appended claims.

What is claimed is:

1. In a volumetric metering apparatus for dosing constant quantities of granular material, including a generally vertically oriented shaft having a shaft axis, a cylindrical trough having a generally horizontal trough base and being mounted on said shaft for rotation about the shaft axis; a plurality of metering receptacles secured to said trough base and extending downwardly therefrom; each said metering receptacle having a top opening being in a continuous communication with a space above said trough base and a bottom outlet openable and closable by a shutoff element; an evener device stationarily supported above said trough base; said metering receptacles being arranged to be brought in succession into alignment with said evener device by the rotation of said cylindrical trough; said evener device having a radial dimension measured parallel to said trough base; said radial dimension being greater than a diametral dimension of each said top opening; the improvement wherein said evener device comprises a rotationally symmetrical disc having an upwardly tapering conical wall provided with a sharp peripheral edge constituting a material evening edge extending parallel to said trough base; said conical wall having a roughened outer face; said disc being supported for rotation about a disc axis being spaced from and parallel to said shaft; further wherein said disc is arranged to entirely cover the top opening of the metering receptacle being in alignment with said disc; the improvement further comprising drive means for rotating said disc.

2. A volumetric metering apparuts as defined in claim 1, further comprising stationary guide plates supported above said trough base and being arranged for guiding granular material, moved by said disc, into a metering receptacle being out of alignment with said disc.

3. A volumetric metering apparatus as defined in claim 2, wherein said guide plates are oriented outwardly in a horizontal direction, as viewed from said shaft axis.

4. A volumetric metering apparatus as defined in claim 1, wherein said disc has a planar underside.

5. A volumetric metering apparatus as defined in claim 4, wherein said planar underside is oriented generally parallel to said trough base.

6. In a volumetric metering apparatus for dosing constant quantities of granular material, including a generally vertically oriented shaft having a shaft axis, a cylindrical trough having a generally horizontal trough base and being mounted on said shaft for rotation about the shaft axis; a plurality of metering receptacles secured to said trough base and extending downwardly therefrom; each said metering receptacle having a top opening being in a continuous communication with a space above said trough base and a bottom outlet openable and closable by a shutoff element; an evener device stationarily supported above said trough base; said metering receptacles being arranged to be brought in succession into alignment with said evener device by the rotation of said cylindrical trough; said evener device having a radial dimension measured parallel to said trough base; said radial dimension being greater than a diametral dimension of each said top opening; the improvement wherein said evener device comprises a rotationally symmetrical disc having an upwardly tapering conical wall provided with a sharp peripheral edge constituting a material evening edge extending parallel to said trough base; said conical wall having a cone angle in excess of 120°; said disc being supported for rotation about a disc axis being spaced from and parallel to said shaft; further wherein said disc is arranged to entirely cover the top opening of the metering receptacle being in alignment with said disc; the improvement further comprising drive means for rotating said disc.

7. A volumetric metering apparatus as defined in claim 6, further comprising stationary guide plates supported above said trough base and being arranged for guiding granular material, moved by said disc, into a metering receptacle being out of alignment with said disc.

8. A volumetric metering apparatus as defined in claim 7, wherein said guide plates are oriented outwardly in a horizontal direction, as viewed from said shaft axis.

9. A volumetric metering apparatus as defined in claim 6, wherein said disc has a planar underside.

10. A volumetric metering apparatus as defined in claim 9, wherein said planar underside is oriented generally parallel to said trough base.

* * * * *